United States Patent [19]
Hattori et al.

[11] Patent Number: 5,798,819
[45] Date of Patent: Aug. 25, 1998

[54] PROJECTION-DISPLAY APPARATUS AND METHOD PROVIDING IMPROVED BRIGHTNESS OF PROJECTED COLOR IMAGE

[75] Inventors: Tetsuo Hattori, Yokohama; Yoshiro Oikawa, Tokyo, both of Japan

[73] Assignee: Nikon Corporation, Tokyo, Japan

[21] Appl. No.: 763,331

[22] Filed: Dec. 11, 1996

[30] Foreign Application Priority Data

Dec. 12, 1995 [JP] Japan .................. 7-346367

[51] Int. Cl.$^6$ .................................. G03B 21/14
[52] U.S. Cl. .................. 353/33; 353/20; 353/31; 349/9
[58] Field of Search .................. 353/8, 20, 31, 353/33, 34, 37; 349/5, 8, 9, 15

[56] References Cited

U.S. PATENT DOCUMENTS

| | | | |
|---|---|---|---|
| 4,127,322 | 11/1978 | Jacobson et al. | 353/31 |
| 5,028,121 | 7/1991 | Baur et al. | 349/9 |
| 5,172,254 | 12/1992 | Atarashi et al. | 353/20 |
| 5,357,289 | 10/1994 | Konno et al. | 353/33 |
| 5,575,548 | 11/1996 | Lee | 353/31 |

FOREIGN PATENT DOCUMENTS

| | | | |
|---|---|---|---|
| 452634 | 2/1992 | Japan | 353/8 |
| 457045 | 2/1992 | Japan | 353/8 |
| 5107661 | 4/1993 | Japan | 353/20 |

*Primary Examiner*—William Dowling
*Attorney, Agent, or Firm*—Klarquist Sparkman Campbell Leigh & Whinston, LLP

[57] ABSTRACT

Methods and apparatus are disclose for obtaining a bright projected color image. In a representative apparatus, polarized beam splitters (one for each primary color of an image to be projected) separate p-polarized light and s-polarized light for each of the primary colors. Each separated s- and p-polarized light for each color enters a respective spatial light modulator. For each primary color, modulated light fluxes produced by the two spatial light modulators, which perform modulation of the same image, are analyzed and integrated by the polarized beam splitters. The analyzed and integrated light fluxes for each primary color are color integrated, either by projection using separate projection lenses for each color, or by a cross-dichroic prism followed by projection using a single lens.

16 Claims, 1 Drawing Sheet

PROJECTION-DISPLAY APPARATUS AND METHOD PROVIDING IMPROVED BRIGHTNESS OF PROJECTED COLOR IMAGE

FIELD OF THE INVENTION

This invention pertains to projection-display apparatus, more specifically to such apparatus operable to project a color image defined by multiple spatial light modulators.

BACKGROUND OF THE INVENTION

A prior-art projection-display apparatus employing multiple spatial light modulators and operable to project a color image is shown in FIG. 2. In the FIG. 2 apparatus, a white illumination-light flux is emitted from a light source 201 that comprises, for example, a metal-halide or xenon lamp and reflective parabolic mirror. The illumination-light flux typically passes through a filter (not shown) operable to absorb ultraviolet rays and a collimator (not shown) operable to make parallel the rays comprising the illumination-light flux. The illumination-light flux then enters a polarizing beam-splitter prism 202. The polarizing beam-splitter prism 202 comprises a beam-splitting layer 203 operable to split the incident illumination-light flux into p-polarized light and s-polarized light. The p-polarized light passes unaltered through the beam-splitting layer 203 and is discarded, while the s-polarized light is reflected by the beam-splitting layer 203 and then separated into the three primary colors (red, blue, green) by passage through a blue-reflective dichroic mirror 204B (which reflects blue and passes red and green) and through a red-reflective dichroic mirror 204R (which reflects red and passes green). The reflected blue s-polarized light impinges as "reading" light on a "blue" spatial light modulator 205B. The reflected red s-polarized light impinges as "reading" light on a "red" spatial light modulator 205R. The green s-polarized light impinges as "reading" light on a "green" spatial light modulator 205G.

The spatial light modulators 205R, 205B, 205G are usually reflective-type spatial light modulators having a cross-sectional structure as shown, e.g., in FIG. 3. The spatial light modulator of FIG. 3 comprises, from the "writing" light side (i.e., the left side in FIG. 3), a first transparent glass substrate 211; a first transparent conductive layer (e.g., ITO film) 212 operable as a first transparent electrode; a photoconductive layer 213 made, e.g., from amorphous silicon hydride; a "light-blocking" layer 214 made from, e.g., cadmium-tellurium; a reflective-mirror layer 215 made from, e.g., multiple layers of dielectric; a first liquid-crystal orientation layer 216 made from, e.g. polyimide; a liquid-crystal layer 217 operable as a light-modulation layer, a second liquid-crystal orientation layer 218 made from, e.g., polyimide; a second transparent conductive layer (e.g., ITO film) 219 operable as a second transparent electrode; and a second transparent glass substrate 220. The thicknesses of the reflective-mirror layer 215 and/or the liquid-crystal layer 217 will differ according to the wavelength of light with which the spatial light modulator is used, but the basic structure is the same for each of the spatial light modulators 205R, 205B, 205G. An alternating-current voltage is applied between the first and second transparent electrodes 212, 219.

When a "writing" light enters from the left side in FIG. 3 and impinges on a locus of the photoconductive film 213, the impedance of the photoconductive film at the locus decreases. This causes a voltage potential to develop across the liquid-crystal layer at that locus. At the locus and in response to the voltage potential, molecules of the liquid crystal become oriented sufficiently to become birefringent. The birefringent locus causes any s-polarized "reading" light (entering from the right in FIG. 3) incident on the locus to become circularly polarized. The circularly polarized light is reflected by the mirror layer 215 and, as the reflected light again passes through the liquid-crystal layer 217, the light becomes p-polarized light and exits the spatial light modulator (toward the right in FIG. 3) as modulated light.

When no "writing" light impinges on a locus of the photoconductive film 213, the impedance at that locus remains sufficiently high that a voltage potential does not develop across the liquid-crystal layer 217 at the locus. As a result, molecules of the liquid crystal at the locus do not become birefringent. Any s-polarized "reading" light incident on the locus (from the right in FIG. 3) is optically rotated according to the orientation of the liquid-crystal molecules at the locus, is reflected by the dielectric mirror 215, and again optically rotated according to the orientation of the liquid-crystal molecules at the locus. The reflected light exits the spatial light modulator unchanged as s-polarized light.

"Writing" light for the FIG. 2 embodiment is usually supplied by three CRT screens (not shown), one for each primary color. The writing light is impinged on the respective spatial light modulator 205B, 205R, 205G to "write" the video image for each color on these spatial light modulators. Light of a suitable wavelength for the particular photosensitivity of the photoconductive film 213 in each spatial light modulator is used as the writing light for each modulator; for example, red light is optimum when the photoconductive film 213 is an amorphous silicon hydride.

Each spatial light modulator 205R, 205B, 205G modulates the incident "reading" light (s-polarized light) as described above according to the writing light. The reflected modulated light propagates in the opposite direction from the incident direction and returns again to the dichroic mirrors 204B, 204R, where the colors of reflected modulated light are integrated. The color-integrated modulated light propagates into the polarizing beam-splitter prism 202 in which the s-polarized component of the color-integrated light is reflected by the beam-splitting layer 203 and discarded; the p-polarized component of the color-integrated light passes through the beam-splitting layer 203 and is projected by a projection lens 206 onto a screen (not shown).

In the prior-art apparatus described above, color separation and color integration are performed by the same dichroic mirrors 204B, 204R. However, apparatus are known in the prior art where color separation and color integration are performed by separate dichroic mirrors or dichroic prisms.

The trend in projection-display technology is toward ever brighter projected images. Unfortunately, in prior-art apparatus such as described above, the image cannot be made as bright as desired when projected onto, e.g., a large screen such as a movie screen. This is because a portion of the light (s- or p-polarized portion) is discarded and thus does not contribute to the brightness of the projected image.

SUMMARY OF THE INVENTION

The present invention addresses the shortcomings of the prior art described above. A key object of the invention is to provide a projection-display apparatus operable to produce a brighter projected image than prior-art projection-display apparatus.

According to a preferred embodiment of a method according to the present invention, an illumination light flux is separated into separate light fluxes corresponding to the primary colors making up the illumination light flux. For each light flux corresponding to a primary color, a p-polarized light flux and an s-polarized light flux are separated. Each p-polarized light flux and each s-polarized light flux are separately modulated according to the image to be projected, preferably using separate spatial light modulators. For example, for an illumination light flux comprising the three primary colors (red, green, and blue) a total of six spatial light modulators are employed. The resulting modulated p-polarized light and modulated s-modulated light for each primary color are integrated. Finally, the integrated modulated light fluxes for each primary color are combined to produce a viewable image.

According to the preferred embodiment of the method, the integrated modulated light fluxes for the primary colors are integrated (preferably by passage through a color-integrating prism) and collectively projected through a projection optical system (e.g., a projection lens) to a suitable surface for viewing the image. Alternatively, the integrated modulated light fluxes for each primary color are individually projected to form the color image on the surface on which the image is projected.

Importantly, in methods according to the present invention, one or the other of s-polarized light and p-polarized light is not discarded. Thus, the projected image formed according to the method is appreciably brighter than would be obtainable using prior-art methods and the same intensity of illumination light flux.

Preferably, separating the p-polarized light from the s-polarized light for each primary color prior to modulation, and integrating the p-polarized light and the s-polarized light after modulation are performed using polarizing beam-splitter prisms.

A preferred embodiment of an apparatus according to the present invention comprises a color separator, plural spatial light modulators and polarizing beam splitters, and a color integrator. The color separator is situated relative to an illumination light flux comprising multiple primary colors. The color separator is operable to separate the illumination light flux into separate primary-color illumination-light fluxes. For each primary color, the apparatus comprises first and second spatial light modulators, one being operable to modulate, according to the image to be projected, an s-polarized primary-color illumination light flux and the other being operable to modulate a p-polarized primary-color illumination light flux. For example, if the illumination light flux comprises the primary colors red, green, and blue, the apparatus comprises two spatial light modulators for each primary color, one modulator for s-polarized light and one for p-polarized light of each primary color. Also for each primary-color illumination-light flux, the apparatus comprises a separate polarizing beam splitter operable to: (a) before modulation, split the primary-color illumination light flux into a p-polarized light flux and an s-polarized light flux corresponding with the respective primary-color illumination light flux for routing to the respective first and second spatial light modulators for each primary-color illumination light flux; and (b) integrate modulated light fluxes produced by the first and second spatial light modulators for each primary-color illumination light flux. Finally, the apparatus comprises a color integrator operable to combine the integrated light fluxes from the polarizing beam splitters to produce the color image.

Further according to a preferred embodiment, the apparatus comprises a source of illumination light operable to produce an illumination light flux comprising multiple primary colors and to direct the illumination light flux to the color separator. The color separator preferably comprises a blue-reflective dichroic mirror and a red-reflective dichroic mirror situated in an X-configuration relative to each other.

Further according to a preferred embodiment, the first and second spatial light modulators for each primary-color illumination light flux comprises first and second reflective spatial light modulators, and further preferably electrically writing reflective spatial light modulators.

Further according to the preferred embodiment, each of the polarizing beam splitters (one for each primary color) are polarizing beam-splitter prisms. Such prisms preferably have orthogonal surfaces on which the first and second spatial light modulators are mounted.

Further according to the preferred embodiment, the color integrator preferably comprises a crossdichroic prism that combines the integrated modulated light fluxes from the polarizing beam splitters and delivers an integrated modulated light flux to a single projection lens for projection of the viewable image onto a surface. Alternatively, the color integrator can comprise separate projection lenses, one for each primary color, that individually receive modulated light flux from a corresponding polarizing beam splitter and project that light flux onto a surface where the primary-color images are integrated into a single color image. I.e., in the alternative scheme, color integration is performed on the screen rather than before actual projection onto the screen.

An alternative embodiment of an apparatus according to the present invention comprises a color separator, plural spatial light modulators and polarizing beam splitters, and a color integrator, as described above. The color integrator is operable to integrate the integrated modulated light fluxes from the polarizing beam splitters to produce a light output. The alternative embodiment also comprises a projection optical system that is operable to project the light output and produce the color image on a surface for viewing.

In the foregoing embodiments, unlike projection-display apparatus according to the prior art, two spatial light modulators are used for each primary color rather than only one. Thus, for the primary colors red, green, and blue, a total of six spatial light modulators are employed. Each primary color of illumination light is polarization-divided into p-polarized light and s-polarized light; the polarization-separated p-polarized illumination light fluxes are separately incident on three spatial light modulators individually corresponding with each primary color, and the polarization-separated s-polarized illumination light fluxes are separately incident on three spatial light modulators individually corresponding with each primary color. Thus, both spatial light modulators for each primary color perform modulation of the same image. Each primary color of modulated light is then respectively analyzed and integrated. By combining, for each primary color, modulated light fluxes for both p-polarized and s-polarized light (rather than using one and discarding the other as in the prior art), a remarkably brighter projected image can be obtained compared to the prior art.

In any of the embodiments of apparatus according to the present invention, reflective spatial light modulators or transmitting spatial light modulators can be used. Use of the reflective type allows for a simpler and hence preferred structure because, for each primary color, a single polarizing beam splitter can be used as the polarizer, light analyzer, and integrator for the modulated light corresponding to an image. Such a polarizing beam splitter has a "p-polarized" light emission side and an "s-polarized" light emission side (usually situated in orthogonal relationship). This allows the spatial light modulator for p-polarized light to be mounted to one such side, and the spatial light modulator for the spolarized light to be mounted to the other such side, respectively.

In addition, optically-writing spatial light modulators can be used rather than electrically-writing spatial light modulators. Use of electrically-writing spatial light modulators is preferred because they eliminate the need for a writing optical system that would comprise a CRT, relay lens, etc.; this more readily allows miniaturization.

The foregoing and additional features and advantages of the present invention will be more readily apparent from the following detailed description, which proceeds with reference to the accompanying drawings.

DETAILED DESCRIPTION

Figure 1:
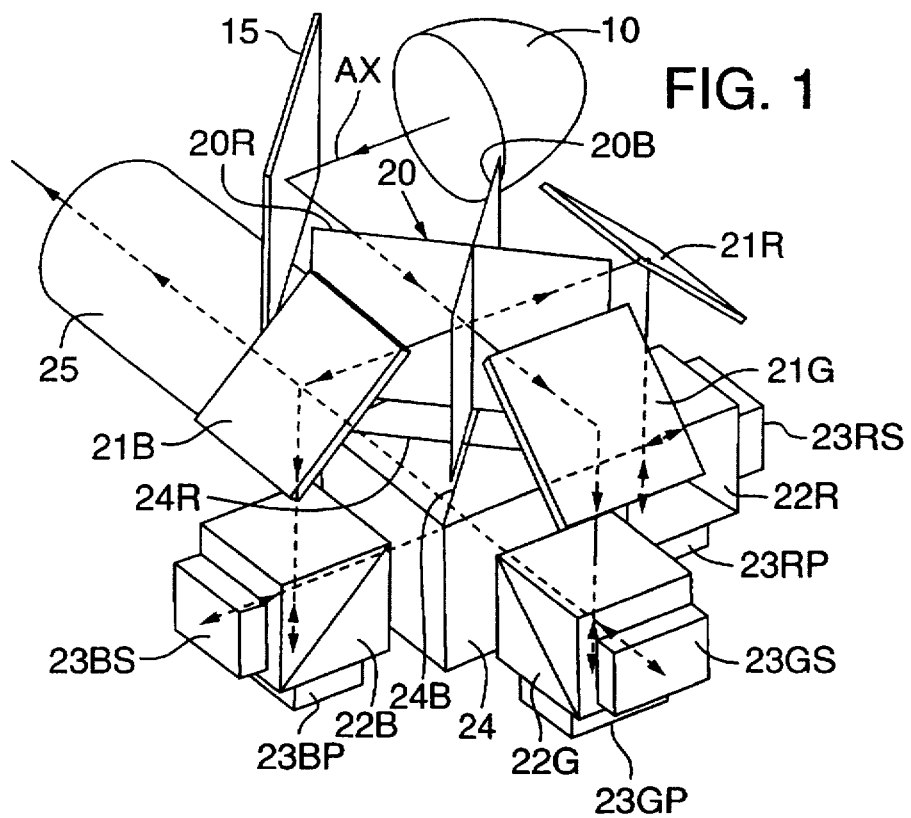
FIG. 1 is an oblique view showing the general construction of a preferred embodiment of a projection-display apparatus according to the present invention.
Figure 2:
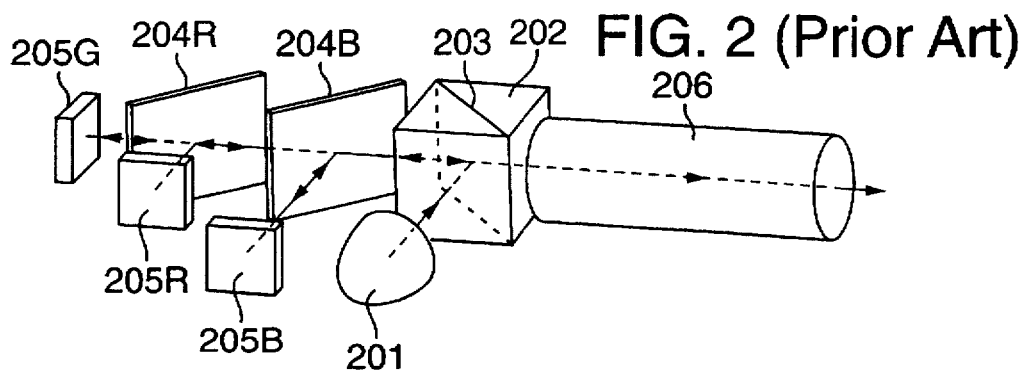
FIG. 2 is an oblique view showing the general construction of a prior-art projection-display apparatus.

A preferred embodiment of a projection-display apparatus according to the present invention is depicted in FIG. 1, which represents the current best mode. The FIG. 1 embodiment comprises an illumination-light source 10; a planar mirror 15; a color separator 20 comprising a blue-reflecting dichroic mirror 20B and a red-reflecting dichroic mirror 20R (the mirrors 20B, 20R collectively having an X-configuration); planar mirrors 21R, 21G, 21B; polarizing beam-splitter prisms 22B, 22R, 22G; spatial light modulators 23BP, 23BS, 23GP, 23GS, 23RP, 23RS; and a cross-dichroic prism 24, all preferably arranged relative to each other essentially as shown.

The illumination-light source 10 can be a conventional type, normally comprising a concave reflective mirror and a source of white light. The source of white light is typically a metal halide lamp or xenon lamp. The concave reflective mirror is situated rearwardly of the source of white light so as to reflect rays from the source of white light and form substantially parallel rays of illumination light propagating along an optical axis AX. Light flux from the illumination-light source 10 normally passes through a UV-absorbing filter and an IR-absorbing filter (not shown).

The optical axis AX of the illumination light is bent by the planar mirror 15 to allow the illumination light to enter the color separator 20. The blue-reflecting dichroic mirror 20B and the red-reflecting dichroic mirror 20R of the color separator 20 separate the incident white illumination light into a red light (R) flux, a green light (G) flux, and a blue light (B) flux. The R, G, B fluxes are each randomly polarized.

The R, G, B fluxes are reflected by the planar mirrors 21R, 21G, 21B, respectively, to make the axes of the light fluxes parallel with each other. The planar mirrors 21R, 21G, 21B can be made of reflective metal. However, to minimize loss of light flux, it is preferable that the planar mirrors 21R, 21G, 21B be dielectric mirrors specially adapted to reflect light of the respective color. Dielectric mirrors typically comprise multiple thin-film layers formed by vacuum deposition on a glass plate. Dielectric mirrors are also preferable because they are better than metallic mirrors in preserving the randomly polarized nature of the light as the light is being reflected therefrom.

Each of the reflected R, G, and B colored-light fluxes then enters the respective polarizing beam-splitter prism 22R, 22G, 22B, which are arranged relative to the respective planar mirrors 21R, 21G, 21B to receive the respective colored light flux.

In the polarizing beam-splitter prisms 22B, 22R, 22G, the respective randomly polarized B, R, G light fluxes are separated into p-polarized light and s-polarized light. The p-polarized light passes through and the s-polarized light is reflected by the respective polarizing beam-splitter prism 22B, 22R, 22G.

The blue p-polarized light, after having passed through the "blue" polarizing beam-splitter prism 22B, enters the spatial light modulator 23BP as "reading" light. The blue s-polarized light, after having been reflected by the "blue" polarizing beam-splitter prism 22B, enters the spatial light modulator 23BS as "reading" light. Similarly, the red and green p-polarized lights that have passed through the respective "red" and "green" polarizing beam-splitter prisms 22R, 22G enter the respective spatial light modulators 23RP, 23GP as "reading" lights; and the red and green s-polarized lights that have been reflected by the respective "red" and "green" polarizing beam-splitter prisms 22R, 22G enter the spatial light modulators 23RS, 23GS as "reading" lights.

In this embodiment, each of the spatial light modulators 23BP, 23BS, 23RP, 23RS, 23GP, 23GS is preferably an electrically writing, reflective spatial light modulator, most preferably such as disclosed in, e.g., in Japan Kôkoku Patent Publication No. HEI 5-82793. It will be appreciated that the spatial light modulators 23BP, 23BS, 23RP, 23RS, 23GP, 23GS are not limited to such types; a variety of other types of electrically writing reflective spatial light modulators can be used alternatively.

The preferred type of electrically writing reflective spatial light modulators comprise a transparent electrode (common electrode) formed over the entire surface of the spatial light modulator on the side at which "reading" light is incident. Multiple pixel electrodes are formed in a matrix on the opposing side, and a liquid crystal layer is sandwiched therebetween. Each of the pixel electrodes comprises a reflective surface, such as of aluminum or other suitable reflective metal. Each of the pixels also has associated therewith a switching circuit comprising MOS field-effect transistors (i.e., thin-film transistors; abbreviated TFT) and capacitors.

At each pixel, a voltage can be applied across the associated locus of the liquid crystal layer whenever the corresponding MOS field-effect transistor is switched on. An "electric field controlled birefringence effect" (ECB) liquid crystal material is used in the liquid crystal layer. In pixels that are not turned on (i.e., in which no voltage is applied across the liquid crystal layer), polarized light entering the pixels as "reading" light passes through the corresponding loci in the liquid crystal layer without experiencing any change in polarization; the light is then reflected by the reflective portions of the corresponding pixel electrodes and again passes through the corresponding loci in the liquid crystal layer, without the light experiencing any net change in polarization, to exit the spatial light modulator. Thus, light reflected from pixels that are not turned on experiences no change in polarization relative to the incident light.

At pixels that are turned on (i.e., in which a voltage is applied across the corresponding loci in the liquid crystal layer), the liquid crystal layer at the loci is birefringent. As a result, light passing through each such pixel has a polarization plane that is rotated 90° with respect to the incident polarized light.

In will be appreciated from the foregoing that only light reflected from pixels that are turned on by corresponding "write" signals experiences a change in polarization orientation.

Hence, the respective colors of s-polarized light entering the spatial light modulators 23BS, 23GS, 23RS as "reading" light are locally (at each pixel "turned on" by an electrical "write" signal) changed into p-polarized light as the light reflects from the respective spatial light modulators 23BS, 23GS, 23RS. At pixels that remain "off", the light reflects as s-polarized light. Similarly, the respective colors of p-polarized light entering the spatial light modulators 23BP, 23GP, 23RP as "reading" light are locally (at each pixel turned on by an electrical "write" signal) changed into s-polarized light as the light reflects from the respective spatial light modulators 23BP, 23GP, 23RP. At pixels that remain "off", the light reflects as p-polarized light.

In this embodiment, the same electrical "write" signal is conducted to both spatial light modulators 23BS, 23BP; thus, modulation of the same video image is performed simultaneously by both spatial light modulators 23BS, 23BP. Similarly, the same electrical "write" signal is conducted to both spatial light modulators 23GS, 23GP; thus, modulation of the same video image is performed simultaneously by both spatial light modulators 23GS, 23GP. Likewise, the same electrical "write" signal is conducted to both spatial light modulators 23RS, 23RP; thus, modulation of the same video image is performed simultaneously by both spatial light modulators 23RS, 23RP.

Modulated light reflected from the spatial light modulators 23BS, 23GS, 23RS enters the respective polarizing beam-splitter prisms 22B, 22G, 22R which allow only the p-polarized light (i.e., light that underwent a polarization change from "s" to "p") to be transmitted through (i.e., "analyzed" by) the beam-splitting layer in each polarizing beam-splitter prism 22B, 22G, 22R. Similarly, modulated light reflected from the spatial light modulators 23BP, 23GP, 23RP enters the respective polarizing beam-splitter prisms 22B, 22G, 22R which allow only the s-polarized light (i.e., light that underwent a polarization change from "p" to "s") to be transmitted through (i.e., "analyzed" by) the beam-splitting layer in each polarizing beam-splitter prism 22B, 22G, 22R.

The analyzed p-polarized blue light and the analyzed s-polarized blue light are integrated by the polarizing beam-splitter prism 22B and enter the cross-dichroic prism 24, which functions as a color integrator. In a similar manner, analyzed p- and s-polarized green light and analyzed p- and s-polarized red light are integrated by the cross-dichroic prism 24.

Hence, this embodiment and other embodiments according to the present invention are distinguishable from the prior art because, according to the invention, each of the various colors B, G, R of both p-polarized light and s-polarized light, after being modulated and reflected by the respective spatial light modulator and after being "analyzed" by the respective polarizing beam-splitter prism 22B, 22G, 22R, are integrated. This is in stark contrast with the prior art in which either the s-polarized light or the p-polarized light is discarded before the colors are integrated.

The cross-dichroic prism 24 is preferably a prism comprising four transparent members each having a right isosceles triangular transverse section. The transparent members are cemented together to provide the cross-dichroic prism 24 with a, preferably, square profile. A red-reflecting dichroic layer 24R and a blue-reflecting dichroic layer 24B form an X-shaped inclusion between the mating surfaces of the transparent members. Preferably, each dichroic layer 24R, 24B is a multilayer lamination, to a desired thickness, of high-refractive-index titanium oxide ($TiO_2$) film and low-refractive-index silicon dioxide ($SiO_2$) film.

Blue "analyzed" light (both s- and p-polarized) that has been integrated by the polarizing beam-splitter prism 22B is reflected by the blue-reflecting dichroic layer 24B; green "analyzed" light (both s- and p-polarized) that has been integrated by the polarizing beam-splitter prism 22G is transmitted unchanged through the cross-dichroic prism 24; and red "analyzed" light (both s- and p-polarized) that has been integrated by the polarizing beam-splitter prism 22R is reflected by the red-reflecting dichroic layer 24R. Thus, the various primary colors of "analyzed" light are color-integrated by and exit from the cross-dichroic prism 24. The color-integrated light is then projected by a projection lens 25 onto a screen (not shown).

Therefore, both the p-polarized light and the s-polarized light associated with each primary color R, G, B of light receive modulation for the same video image in two respective spatial light modulators for each primary color. Without discarding one of the p-polarized light or s-polarized light associated with any of the primary colors, all primary colors of reflected modulated light are analyzed and integrated. In other words, both the p-polarized light and the s-polarized light, which were polarization-separated for modulation of each primary color, are integrated and thus utilized to form the projected color image. Consequently, a remarkably brighter projected color image can be obtained with an apparatus according to this invention, compared to projection-display apparatus according to the prior art that utilize only s-polarized or p-polarized light for each primary color to form the projected color image.

It will be understood that any of various alternative embodiments of this invention are possible. For example, although the color separator 20 is preferably a red-reflecting dichroic mirror crossed with a blue-reflecting dichroic mirror (i.e., a cross-dichroic mirror), a cross-dichroic prism can be used instead. Whenever a cross-dichroic mirror or a cross-dichroic prism is used as the color separator, the light-path lengths from the illumination light source to the spatial light modulator for each primary color can be made equal even if a light-path-correcting optical element is not used for each primary color R, G, B. Furthermore, since the light-path lengths from each spatial light modulator to the screen are the same (because the "write" image on each spatial light modulator is in a conjugate relationship with the image on the screen relative to the projection lens), the light-path length from the illumination light source to the screen for each primary color can be made equal. Keeping such path lengths substantially equal helps minimize color variations caused by differences in light-path lengths.

With respect to other alternative embodiments, a cross-dichroic mirror rather than a cross-dichroic prism 24 can be used as the color integrator. In addition, dichroic mirrors arranged parallel with each other, or dichroic mirrors arranged in a V-configuration can also be used as the color separator and/or color integrator. In such instances, optics for correcting lengths of light paths for one or more primary colors may be necessary to ensure that each light-path length through the respective polarizing beam-splitter prism to the respective spatial light modulator is either different or equal to the other light-path lengths.

According to another alternative embodiment, a compound prism such as used for color separation in a conventional color television camera, in which three prisms are combined, can be used as the color separator and color integrator. With such an embodiment, optics for correcting light-path-length differences may be required as described above.

With respect to yet another alternative embodiment, transmitting spatial light modulators can be used instead of reflective spatial light modulators. However, use of reflective spatial light modulators as in the preferred embodiment allows a simpler construction of the apparatus. In addition, the polarizing beam-splitter prism corresponding to each primary color of light can be used as the polarizer, analyzer, and integrator for each modulated primary color of light simply by situating one of the two spatial light modulators for each primary color on the side of the respective polarizing beam-splitter prism from which p-polarized light of that color is emitted, and situating the other of the two spatial light modulators for that color on the side of the respective polarizing beam-splitter prism from which s-polarized light of that color is emitted.

Figure 3:
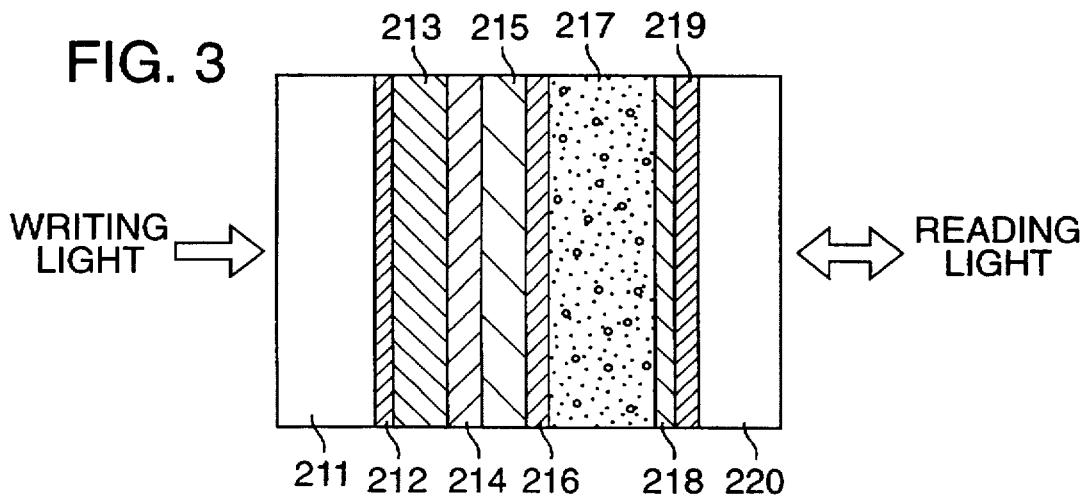
FIG. 3 is a schematic sectional view of a representative optically writing reflective spatial light modulator usable with the FIG. 1 embodiment.

Furthermore, whereas electrically writing spatial light modulators are preferably used, optically writing spatial light modulators, such as shown in FIG. 3, can alternatively be used. If electrically writing spatial light modulators are used, a writing optical system, such as a CRT or relay lens, etc., is not required, which is preferable from the standpoint of miniaturization.

Furthermore, the preferred and alternative embodiments described above are examples of projection-display apparatus according to the present invention comprising a single projection lens; i.e., the various primary light colors R, G, B are integrated in advance by a color integrator and the video image is projected by a single projection lens. Alternatively, for example, a three-projection-lens configuration can also be used in which color integration is performed on the screen without using a color-integrating optical element. I.e., in such an alternative embodiment, the various primary colors R, G, B are individually projected onto the screen by three projection lenses without any color integration being performed prior to projection.

Whereas the invention has been described in connection with a preferred and various alternative embodiments, it will be understood that the invention is not limited to those embodiments. On the contrary, the invention is intended to encompass all alternatives, modifications, and equivalents as may be included within the spirit and scope of the invention as defined by the appended claims.

What is claimed is:

1. A method for forming a projected color image, comprising the steps:
   (a) from a flux of illumination light comprising multiple primary colors, separating light fluxes corresponding to the primary colors making up the illumination light flux;
   (b) for each light flux corresponding to a primary color, separating a p-polarized light flux and an s-polarized light flux;
   (c) modulating the p-polarized light flux and the s-polarized light flux of each primary color according to an image to be projected;
   (d) integrating the modulated p-polarized light and the modulated s-polarized light for each primary color to form an integrated modulated light flux for each primary color; and
   (e) passing the integrated modulated light fluxes for each primary color through a cross-dichroic prism to produce a color-image-forming light flux.

2. The method of claim 1, wherein, in step (e), the modulated light fluxes for each primary color are combined to form a combined image before the combined image is projected to form the color image.

3. The method of claim 1, wherein, in step (e), the modulated light fluxes for each primary color are individually projected to form the color image on a projection surface.

4. The method of claim 1, wherein step (b) comprises passing the light flux corresponding to each of the primary colors through a respective polarizing beam-splitter prism.

5. The method of claim 4, wherein step (d) comprises passing the modulated s-polarized light and the modulated p-polarized light for each primary color through the respective polarizing beam-splitter prism.

6. The method of claim 1, wherein step (e) comprises passing the color-image-forming light flux through a projection lens.

7. An apparatus for producing a projected color image, comprising:
   (a) a color separator situated relative to an illumination light flux comprising multiple primary colors, the color separator being operable to separate the illumination light flux into separate primary-color illumination light fluxes;
   (b) for each primary color, a first spatial light modulator operable to modulate, according to the image, an s-polarized primary-color illumination light flux and a second spatial light modulator operable to modulate, according to the image, a p-polarized primary-color illumination light flux;
   (c) for each primary-color illumination light flux, a separate polarizing beam splitter operable to (i) split the primary-color illumination light flux into a p-polarized light flux and an s-polarized light flux corresponding with each primary-color illumination light flux for routing to the respective first and second spatial light modulators for each primary-color illumination light flux, and (ii) integrate modulated light fluxes from the first and second spatial light modulators for each primary-color illumination light flux; and
   (d) a color integrator comprising a cross-dichroic prism operable to combine the integrated modulated light fluxes from the polarizing beam splitters to produce the color image.

8. The apparatus of claim 7, further comprising a source of illumination light operable to produce an illumination light flux comprising plural primary colors and to direct the illumination light flux to the color separator.

9. The apparatus of claim 7, wherein the color separator comprises a blue-reflective dichroic mirror and a red-reflective dichroic mirror situated in an X-configuration with each other.

10. The apparatus of claim 7, wherein the first and second spatial light modulators for each primary-color illumination light flux comprise first and second reflective spatial light modulators.

11. The apparatus of claim 10, wherein the reflective spatial light modulators are of an electrical writing type.

12. The apparatus of claim 7, wherein each of the polarizing beam splitters comprises a polarizing beam-splitter prism having orthogonal surfaces.

13. The apparatus of claim 12, wherein the first and second spatial light modulators for each primary color are mounted on adjacent orthogonal surfaces of the respective polarizing beam-splitter prism.

14. The apparatus of claim 7, wherein the color integrator comprises a projection lens.

15. A projection-display apparatus, comprising:

(a) a light source operable to produce an illumination light flux comprising plural primary colors;

(b) a color separator operable to receive the illumination light flux and separate the illumination light flux into separate primary-color illumination light fluxes;

(c) first and second reflective spatial light modulators for each primary-color illumination light flux separated by the color separator, the first reflective spatial light modulator being operable to receive the respective primary-color illumination light flux and produce therefrom a first reflected polarized light flux modulated according to a desired image to be projected, and the second reflective spatial light modulator being operable to receive the respective primary-color illumination light flux and produce therefrom a second reflected polarized light flux modulated according to the image to be projected;

(d) a polarizing beam splitter for each primary color, each polarizing beam splitter being situated to (i) separate s-polarized light from p-polarized light in the primary-color illumination light flux from the color separator, (ii) direct the s-polarized light to the respective first spatial light modulator and direct the p-polarized light to the respective second spatial light modulator, and (iii) integrate the first and second reflected polarized light fluxes from the respective first and second spatial light modulators;

(e) a color integrator comprising a cross-dichroic prism operable to integrate the integrated modulated light fluxes from the polarizing beam splitters and produce a light output; and (f) a projection optical system operable to project the light output and produce the color image on a surface for viewing.

16. The projection-display apparatus of claim 15, wherein the spatial light modulators are electrically writing spatial light modulators.

* * * * *

UNITED STATES PATENT AND TRADEMARK OFFICE
CERTIFICATE OF CORRECTION

PATENT NO. : 5,798,819

DATED : August 25, 1998

INVENTOR(S) : HATTORI ET AL.

It is certified that error appears in the above-identified patent and that said Letters Patent is hereby corrected as shown below:

On the title page item [57],

Line 1 of the Abstract, "disclose" should be --disclosed--.

Column 3, line 10, "s-modulated" should be -- s-polarized --.

Column 7, line 5, "In" should be --It--.

Signed and Sealed this

Ninth Day of November, 1999

Attest:

Q. TODD DICKINSON

*Attesting Officer*  *Acting Commissioner of Patents and Trademarks*